United States Patent [19]
Wessel et al.

[11] 3,951,113
[45] Apr. 20, 1976

[54] FUEL INJECTION SYSTEM

[75] Inventors: Wolf Wessel, Schwieberdingen; Wilfried Sautter, Ditzingen; Dieter Handtmann, Sindelfingen; Jurgen Abt, Stuttgart, all of Germany

[73] Assignee: Robert Bosch G.m.b.H., Stuttgart, Germany

[22] Filed: Mar. 28, 1975

[21] Appl. No.: 562,918

[30] Foreign Application Priority Data
Apr. 25, 1974  Germany............................ 2420032

[52] U.S. Cl. ........................ 123/32 EA; 123/119 R; 123/139 E
[51] Int. Cl.² ............................................ F02B 3/00
[58] Field of Search ........ 123/32 EA, 119 R, 139 E, 123/140 R

[56] References Cited
UNITED STATES PATENTS

| | | | |
|---|---|---|---|
| 3,713,427 | 1/1973 | Adler .............................. | 123/139 E |
| 3,716,035 | 2/1973 | Adler et al. ...................... | 123/139 E |
| 3,724,430 | 4/1973 | Adler .............................. | 123/119 R |
| 3,750,632 | 8/1973 | Zechnall.......................... | 123/32 EA |
| 3,796,197 | 3/1974 | Locher et al..................... | 123/139 E |

Primary Examiner—Charles J. Myhre
Assistant Examiner—Paul Devinsky
Attorney, Agent, or Firm—Edwin E. Greigg

[57] ABSTRACT

The airflow rate through the induction tube of an internal combustion engine is measured by a first transducer which delivers a set point signal to a control amplifier. The amplifier also receives a feedback signal from a second transducer which monitors the position of a servo-motor controlling the quantity of fuel metered out to the engine. The feedback loop maintains a desired fuel-air ratio and includes provision for calibration and adjustment.

9 Claims, 2 Drawing Figures

FUEL INJECTION SYSTEM

BACKGROUND OF THE INVENTION

The invention relates to a fuel injection system for mixture-compressing, externally ignited internal combustion engines employing continuous fuel injection into the induction tube. The induction tube contains an air flow measuring member in series with an arbitrarily actuatable throttle butterfly valve. The airflow measuring member operates linearly and its transducer determines the magnitude of an external set-point variable for a linear feedback control loop which includes an electric control amplifier tht changes the position of the armature in an electromagnetic servo-motor. The electromagnetic servo-motor actuates a control slide of a fuel metering valve which meters out a fuel quantity in proportion to the air quantity and which is located in the fuel supply line. The electromagnetic servo-motor sets the control slide of the fuel metering valve by means of a cam plate according to an approximately linear functional relationship.

Fuel injection systems of this type serve the purpose to create automatically a favorable fuel-air mixture for all operational and environmental conditions of the internal combustion engine so that the fuel may be combusted as nearly completely as possible and thus the generation of toxic components in the exhaust gases is either prevented or sharply reduced while the engine maintains the highest possible performance or the least possible fuel consumption.

In a known fuel injection system of this type, the measurement of the air flow rate and the subsequent processing and transmission of the derived signal are substantially linear steps. The set path is transmitted linearly from the servo-motor to the control slide of the fuel metering valve by a three-dimensional cam and any further additive or multiplicative corrections to the injected fuel quantity are made by means of further measuring transducers located in the bridge circuit of the feedback control loop.

OBJECT AND SUMMARY OF THE INVENTION

It is the principal object of the invention to provide a fuel injection system of the known type which meets the demands made on this type of fuel injection system and in which a fuel quantity is metered out in proportion to the air quantity aspirated by the engine in a simple manner, and wherein the metered out fuel quantity may be changed multiplicatively or additively in dependence on the operational and environmental conditions of the internal combustion engine.

This object is attained according to the invention in that the cam plate which transmits the motion of the servo-motor is embodied as an eccentric disc on which a ball bearing is mounted. The operational angular domain of the servo-motor is defined between an angle of rotation α of approximately 45° and approximately 135°, as measured from the lower dead center position of the eccentric disc. When the servo-motor is set to an angle of rotation α of approximately 45°, the control slide closes off the fuel metering valve whereas, at an angle α of approximately 135°, the control slide meters out the maximum fuel quantity. The wiper of the linear feedback potentiometer serving as the transducer that signals the magnitude of the controlled variable is actuated by the shaft of the servo-motor and the wiper of the linear control potentiometer serving to provide the set point variable is actuatable by the air quantity measuring member. The set point potentiometer and the feedback potentiometer are located in an electrical bridge circuit whose summation point is connected to the input of the control amplifier. The fuel injection quantity can be changed multiplicatively by changing the maximum voltage of the feedback potentiometer and it may be corrected additively by providing a correction voltage at the summation point of the bridge circuit.

A preferred feature of the invention provides that the control slide of the fuel metering valve and the axis of the eccentric plate are positively connected with one another by means of a spring clamp.

A further advantageous feature of the invention provides that the control amplifier has the time characteristics of a proportional-integral controller with differential effect (PID controller; also called proportional plus reset plus rate action controller).

Another advantageous aspect of the invention provides that the set-point potentiometer and the feedback potentiometer are connected in the opposite electrical sense to the two terminals of the voltage source. One lead of the feedback potentiometer is connected to the positive terminal of the voltage source and the other lead to the output of an operational amplifier whose non-inverting input is provided with a voltage UB/2, equal to half the battery voltage, and whose inverting output may be provided with different correction voltages through differently valued resistances.

Yet another advantageous feature of the invention provides that the feedback potentiometer has taps which can be adjusted to predetermined voltages to linearize the transfer function from the servo-motor to the control slide of the fuel metering valve. The servo-motor may preferably be embodied without a commutator.

The invention will be better understood as well as further objects and advantages thereof become more apparent from the ensuing detailed specification of a preferred although exemplary embodiment of the invention taken in conjunction with the drawing.

DESCRIPTION OF THE PREFERRED EMBODIMENT

Figure 1:
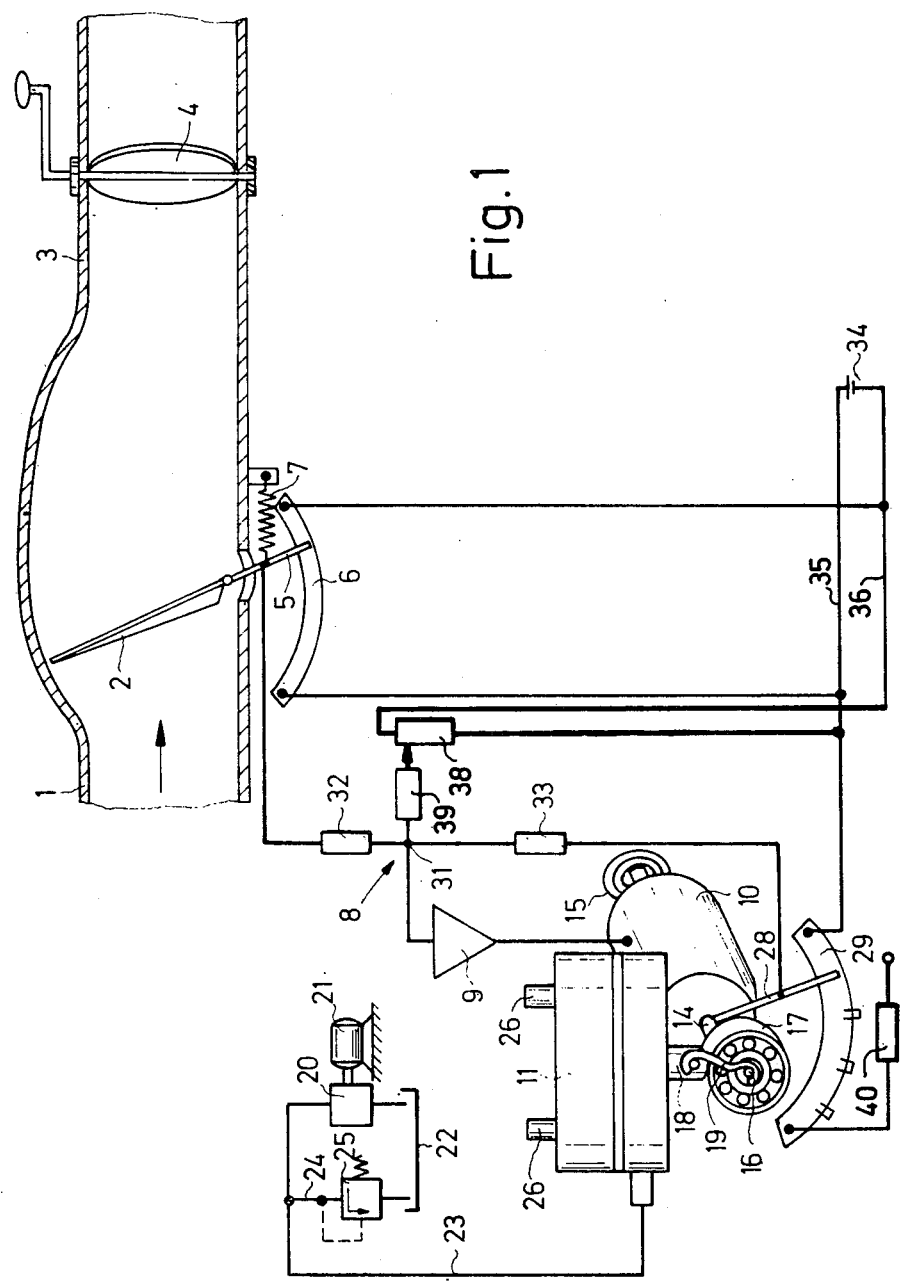
FIG. 1 is a partially schematic diagram of a fuel injection system according to the invention.

Turning now to the fuel injection system depicted in FIG. 1, the combustion air flows in the direction of the arrow through an induction tube region 1 containing an air quantity measuring member 2 and further flows through an induction tube region 3 containing an arbitrarily actuatable butterfly valve 4 and thence to one or several cylinders (not shown) of an internal combustion engine. The air flow measuring member 2 comprises an air flap, pivotably mounted at one end, which actuates the wiper 5 of a linear set-point potentiometer 6 serving as the primary measuring transducer and which is pivotable in opposition to the force of a weak restoring spring 7. Known electronic air flow rate meters could also serve as the airflow rate measuring member.

According to the invention, the airflow rate measuring member 2 obeys a linear characteristic, i.e., there is a linear functional relationship between the aspirated air quantity and the angular deviation of the air flow rate measuring member. The set point variable characterized by the position of the airflow rate measuring member 2 is sent by the linear set point potentiometer 6 into the feedback control loop 8 which includes a control amplifier 9 and an electomagnetic servo-motor 10 which acts on a fuel metering valve 11.

The electromagnetic servo-motor 10 has a rotating shaft 14 which rotates in opposition to the force of a torsional spring 15 and turns an eccentric with a central axis 16 which carries a ball bearing 17. The correction variable of the feedback control loop 8 is transmitted mechanically from the eccentric via the ball bearing 17 to the control slide 18 of the fuel metering valve 11 which then meters out a fuel quantity proportional to the aspirated air quantity. The central axis 16 of the eccentric and the control slide 18 are positively connected with one another by a spring clamp 19.

The fuel metering valve 11 is supplied with fuel by a fuel pump 20 driven by an electric motor 21 and it delivers fuel from a fuel storage container 22 through a line 23 to the fuel metering valve 11. Branching off from the line 23 is a line 24 containing a pressure limiting valve 25 which permits fuel to flow back into the storage container 22 when the system pressure is too high. The metered out fuel quantity flows through injection lines 26 to the individual fuel injection valves which are not shown and which are disposed within the induction tube of the engine in the immediate vicinity of the cylinders.

The rotating shaft 14 of the servo-motor 10 carries a wiper 28 of a linear feedback potentiometer 29 which sends the magnitude of the controlled variable into the feedback control loop 8. The set point variable determined by the position of the airflow rate meter 2 and the magnitude of the controlled variable determined by the position of the rotating shaft 14 of the servo-motor 10 are compared at the input of the control amplifier 9 at the summation point 31 of an electric bridge circuit which contains the set point potentiometer 6, the feedback potentiometer 29 as well as the resistors 32 and 33. The voltage source is the vehicle battery 34 whose two terminals are connected in the opposite electrical sense to the set point potentiometer 6 and the feedback potentiometer 29 via electric wires 35 and 36. An additive correction of the metered out fuel quantity, for example, for the idle setting of the internal combustion engine, can be obtained by providing a supplementary correction voltage to the summing point 31 through a potentiometer 38 and a resistor 39 whereby an additive correction of the fuel quantity takes place in proportion to this voltage.

One lead of the feedback potentiometer 29 is connected to the positive terminal 35 of the voltage source 34 and the other lead is connected to the output of an electronic circuit 40 through which correction voltages are supplied for multiplicative correction, for example, for an altitude correction, so as to obtain a change of the maximum voltage across the feedback potentiometer 29.

The method of operation of the fuel injection system depicted in FIG. 1 is as follows:

When the internal combustion engine is running, air is aspirated through the induction tube 1, 3, thereby deflecting the airflow rate measuring member 2 from its normal position. The characteristic curve of the airflow rate measuring member 2 is linear, i.e., its electrical signal is proportional to the aspirated air quantity. The deflection of the airflow rate measuring member 2 causes the wiper 5 to change the setting of the linear set point potentiometer 6 which serves as the primary control element and delivers the set point variable to the feedback control loop 8. The feedback control loop is linear so that an optimum control characteristic is obtained and fast control changes can take place without the excitation of self-oscillation. The feedback control loop includes a control amplifier which has the time characteristic of a proportional-integral controller with differential action (PID controller; also called a proportional plus reset plus rate action controller). The output signal provided by the control amplifier 9 changes the setting of the electromagnetic servo-motor 10 whose rotating shaft 14 carries an eccentric member which, in turn, supports a ball bearing 17. A spring clamp 19 positively connects the control slide 18 of the fuel metering valve 11 with the eccentric member so that a hysteresis-free motion of the control slide is insured in both directions. When the fuel injection system is inoperative, the rotational shaft 14 and the armature of the electromagnetic servo-motor 10 disposed thereon are returned into their normal position by a torsional spring 15. At the same time, the control slide 18 assumes a position in which it interrupts the flow through the fuel line 23.

The transfer function $H = r(1-\cos\alpha)$ for the correction variable from the electromagnetic servo-motor 10 to the control slide 18 of the fuel metering valve 11 is approximately linear when the angle of rotation $\alpha$ of the rotating shaft 14 lies between 45° and approximately 135°, measured from the lower dead center position of the eccentric member. In the equation, H is the stroke of the control slide 18 and $r$ is the distance between the center of the axis of the rotating shaft and the center of the eccentric member. Any residual control aberration of the transfer function as between the servo-motor and the control slide of the fuel metering valve can be linearized out by providing the feedback potentiometer 29 with taps that can be adjusted to predetermined voltages. The relation between the stroke of the piston of the control slide 18 and the metered out fuel quantity is linear, thus insuring that the metered out fuel quantity is proportional to the aspirated air quantity as measured by the air quantity measuring member 2 in the induction tube.

The rotating shaft 14 of the servo-motor 10 is attached to the wiper 28 of the linear feedback potentiometer 29 which serves as the measuring transducer for the magnitude of the controlled variable. This magnitude is compared with the set point variable provided by the set point potentiometer 6 at a summing junction 31 in the electrical bridge circuit and connected to the input of the control amplifier 9. Multiplicative corrections of the metered out fuel quantity may be made by changing the maximum voltage of the feedback potentiometer 29 through the provision of correcting voltages via the electronic circuit 40.

Figure 2:
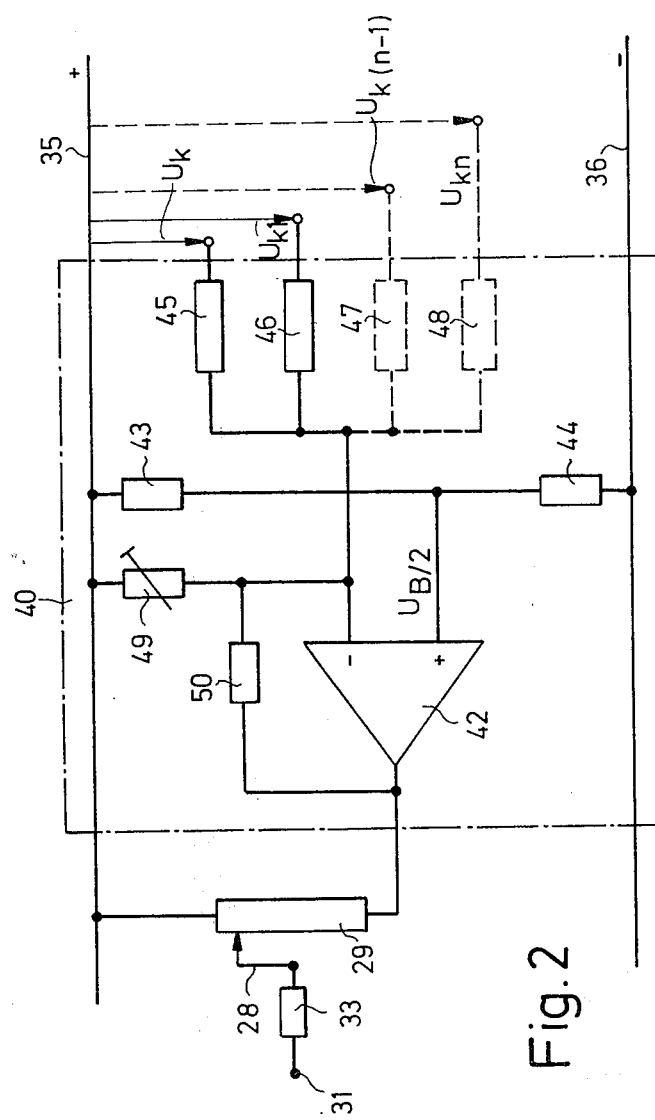
FIG. 2 is a schematic diagram of an electronic circuit for the multiplicative correction of the meteredout fuel quantity.

The electronic circuit 40, shown schematically in FIG. 2, consists of an operational amplifier 42 whose output is connected to one lead of the feedback potentiometer 29 and whose non-inverting input is connected to the mid-point of two identical series resistors 43 and 44 connected across the voltage source 34. The potential of the non-inverting input is therefore half the battery voltage: $U_B/2$. The inverting input of the operational amplifer 42 is connected to different calibrating resistors 45, 46, 47, 48 which supply different correction voltages $U_K$, $U_{K1}$, ... $U_{K(n-1)}$, $U_{Kn}$. The inverting input of the operational amplifier 42 is also connected through a trimmer resistor 49 to the positive terminal 35 of the voltage source. The feedback resistor 50 is connected between the output of the operational amplifier 42 and its inverting input.

The function of the electronic circuit 40 shown in FIG. 2 is as follows:

Without the presence of a correcting voltage, the operational amplifier 42 supplies to the feedback potentiometer 29 a maximum voltage $U_{max}$ which corresponds to the maximum possible metered out fuel quantity when the wiper 28 is fully displaced.

This setting corresponds to the case when there is a maximum airflow rate and the airflow rate measuring member 2, through its set point potentiometer 6, provides the control amplifier 9 with a maximum set point voltage, whereupon the servo-motor 10 and hence also the feedback potentiometer 29 are displaced until such time as the wiper 28 on the feedback potentiometer 29 also carries the maximum voltage $U_{max}$, indicating that the control slide 18 has reached the position for the maximum possible metered out fuel quantity. In the uncorrected case, the trimmer resistor 49 is used to set the maximum voltage $U_{max}$ to the required value at the output of the amplifier 42.

But if, for example during the warm-up phase of the internal combustion engine, a multiplicative correction of the metered out fuel quantity is required, then a correction voltage $U_k$ is provided to the inverting input of the operational amplifier 42 via one of the calibrating resistors 45, whereby the output voltage of the operational amplifier 42, and hence the maximum voltage of the feedback potentiometer 29 is changed, i.e., the voltage determined by the set point potentiometer 6 is matched only when a greater quantity of fuel is being metered out.

The required different correction voltages $U_K - U_{Kn}$ are supplied to the inverting input of the operational amplifier 42 via different calibrating resistors 45 to 48 which characterize the weight of the individual corrections. The correction voltages are determined by primary measuring elements (not shown) which convert the measured parameters into voltages.

Preferaby, the servo-motor 10 can be embodied without a commutator because it is only required to rotate within an angular sector of 90°.

What is claimed is:

1. A fuel injection system for continuous fuel delivery to an internal combustion engine which includes a fuel line, a battery, an induction tube and, seriatim therein, an airflow measuring member and an arbitrarily actuatable throttle valve, comprising:
    a. a first measuring transducer, associated with said airflow measuring member and capable of providing a first electrical signal;
    b. a control amplifier, connected to said first measuring transducer to receive said first electrical signal and energized by said battery;
    c. a servo-motor electrically connected to said control amplifier to receive a control signal therefrom, and including a rotating shaft;
    d. a fuel metering valve assembly, disposed in the fuel line of the internal combustion engine and including a fuel control slide valve;
    e. eccentric means mounted on said rotating shaft of said servo-motor;
    f. further means associated with said eccentric means and also associated with said fuel control slide valve for transmitting the rotary motion of said shaft of said servo-motor to said fuel control slide valve for influencing the fuel quantity delivered by said fuel metering valve assembly; and
    g. a second measuring transducer, associated with said servo-motor and actuated by said shaft of said servo-motor and capable of providing a second electrical signal;
    circuit means whereby said first electrical signal and said second electrical signal are mediately supplied to the input of said control amplifier, thereby constituting a feedback control loop which tends to act so as to vary said second electrical signal substantially corresponding to said first electrical signal.

2. An improved fuel injection system as defined in claim 1, the improvement further comprising:
    h. a spring clamp, for connecting said eccentric member and said fuel control slide valve in a positive force-transmitting manner.

3. An improved fuel injection system as defined in claim 1, wherein said control amplifier has the characteristics of a proportional plus reset plus rate action controller.

4. An improved fuel injection system as defined in claim 1, wherein said first measuring transducer and said second measuring transducer are connected to the battery of the internal combustion engine with opposite respective polarity.

5. An improved fuel injection system as defined in claim 1, the improvement further comprising:
    i. a voltage supply circuit including an operational amplifier and a plurality of resistors mediately connected to the positive battery terminal; wherein the output of said operational amplifier is connected to one input lead of said second measuring transducer.

6. A fuel injection system as defined in claim 5, wherein said operational amplifier has inverting and non-inverting inputs, wherein the non-inverting input of said operational amplifier is connected to the positive terminal of the battery through a midpoint of two identical series resistors; whereby the voltage at the non-inverting input of said operational amplifier is made substantially equal to one half of the voltage of the battery.

7. A fuel injection system as defined in claim 6, wherein the inverting input of said operational amplifier is connected to the junction of said plurality of resistors; whereby different correction voltages may be supplied to the inverting input of said operational amplifier.

8. An improved fuel injection system as defined in claim 1, wherein said second measuring transducer includes a potentiometric surface with electrical taps; whereby the control characteristics of said measuring transducer may be linearized.

9. An improved fuel injection system as defined in claim 1, wherein said servo-motor includes an armature without commutator.

* * * * *